July 24, 1962 E. R. BRUUN 3,045,500
RATE DEVICE
Filed Aug. 25, 1960 2 Sheets-Sheet 1

INVENTOR
EUGENE R. BRUUN
BY Leonard F. Wedelind
ATTORNEY

INVENTOR
EUGENE R. BRUUN
BY Leonard F. Wedelind
ATTORNEY

United States Patent Office 3,045,500
Patented July 24, 1962

3,045,500
RATE DEVICE

Eugene R. Bruun, Hartford, Conn., assignor to United Aircraft Corporation, East Hartford, Conn., a corporation of Delaware
Filed Aug. 25, 1960, Ser. No. 51,888
7 Claims. (Cl. 74—110)

This invention relates to a rate device and more particularly to a device whose rate is proportional to a load imposed on said device.

It is an object of this invention to provide means for obtaining a rate proportional to a load which is characterized as being relatively simple in design and construction and inexpensive to manufacture.

It still is a further object to provide a rate device which varies as a function of load and adapt this device to the input detector of a mechanical servo system for the purposes of maintaining the gain of the servo system substantially constant even though the load on the input detector varies. The gain is defined as the ratio of an output response to a specified change in an input signal, that is to say, that for a given input signal, the output will move to a predetermined position for a given input signal and within a given time.

As an example, when there is a change in the ratio of the forces being sensed on an input detector measuring force ratio, at a given force level, the response time will be at a given value. However, when the force level changes, for the same change in force ratio, a different response time will be evidenced in heretofore known servo systems. My invention, when utilized with a similar ratio input detector, will exhibit identical response times for a given ratio change regardless of the level of the forces sensed.

These and other objects of this invention will become readily apparent from the following detailed description of the drawings in which.

Figure 1:
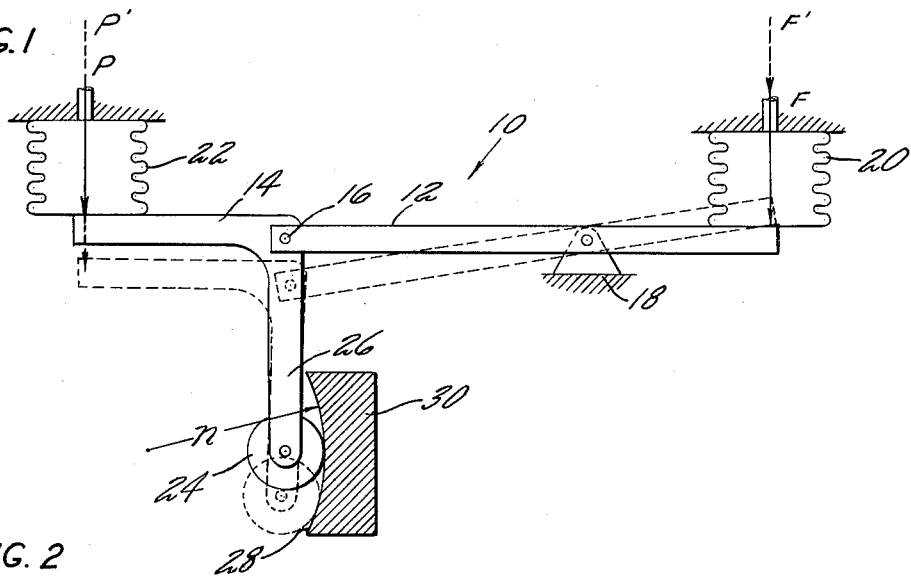
FIG. 1 is a schematic illustration of this invention showing how the rate is made proportional to the load.
Figure 2:
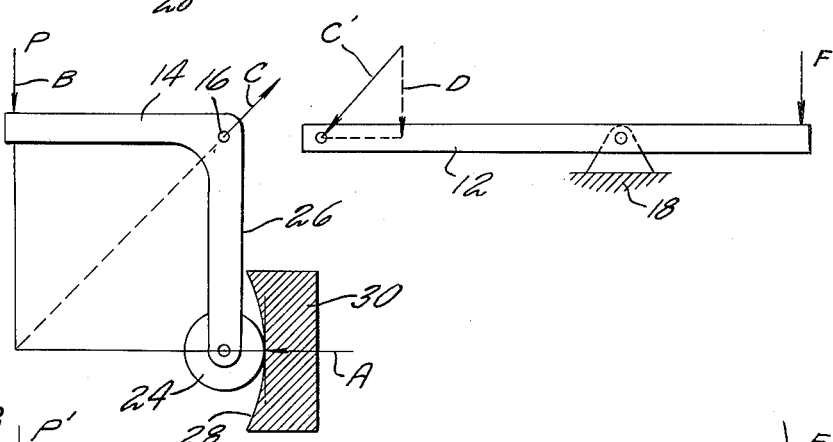
FIG. 2 is a free body diagram of FIG. 1 illustrating the forces acting thereon.
Figure 3:
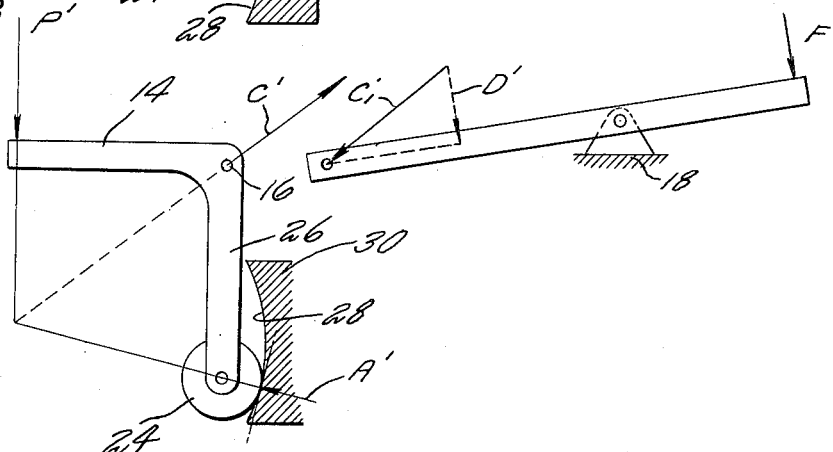
FIG. 3 is a free body diagram of FIG. 1 showing the force acting thereon when a change in force has taken place.

Referring more particularly to FIG. 1 through FIG. 3, a linkage system, generally indicated at 10, comprises a fulcrum lever 12 having a bell crank 14 pivotally secured to the left end of lever 12 by pin 16. Fulcrum lever 12 is pivotally supported by pivot member 18, located intermediate its ends for rotation thereabout in response to the forces generated by either bellows 20 or 22 acting on the ends of lever 12 and the horizontal arm of bell crank 14. The bellows are shown to merely illustrate means for inducing a force or load on the lever system and any other means of inducing a force or load may be employed without deviating from the scope of this invention. Roller 24 is pivotally secured to the bottom end of the vertical arm 26 of bell crank 14 and continuously engages the arcuate surface 28 of cam 30. As will be more fully explained hereinafter, the manner in which the roller 24 cooperates with the cam provides the means for obtaining a rate proportional to the load imposed by either bellows 20 or 22.

Referring to FIG. 2, which illustrates the forces on the lever system as statically balanced when for example, it is in substantially horizontal plane, and will be seen that at the point where contact is made between the roller 24 and cam 30, a reactance force which acts at the point normal to the tangent of this point, indicated by vector A, absorbs the force imposed by bellows 20 and pin 16, which is illustrated by vectors B and C, respectively. It will be noted that the force acting on pin 16 is the resultant of the forces B and A and is obtained by extending the lines of action of vectors A and B and drawing a line through the point of intersection and the center of the pin 16. Of course the magnitude of this force is a function of forces A and B. This resultant force C also acts on fulcrum lever 12 (as indicated by C) and is equal in magnitude and opposite in direction in order to follow the physical laws of static equilibrium. By resolving this vector in its component forces, it is important to realize that the vertical force component D is at a unique magnitude for this particular position of the linkage system when the forces generated by bellows 20 and 22 are at a particular value. It will be realized that changes in this vertical component directly affect the linkage displacement while the horizontal component does not.

Now consider the case when the linkage system is made to vary by a change in either the forces generated by bellows 20 or 22. For illustration purposes, shown in phantom in FIG. 1, is a new position of the linkage system resulting from an increase in the force generated by bellows 22. In its new position it is evident that the reactance force A' has sought a new position along cam 30 as shown in FIG. 3, and by resolving the resultant force acting on pivot point 16 in the same manner as described above, it will be realized that its position and magnitude has changed accordingly. By resolving resultant force acting on lever 12, it will be seen that the component force D' has now changed to a new value.

I have found that the change in moment about pivot 18 resulting from a linkage displacement is proportional to the displacement of point 16 on lever 12, and to the magnitude of force generated by either bellows 20 or 22. (This force is hereinafter referred to as either F or P.) Since there has been a displacement of the linkage system, it must follow that for a unique change in force P or F, there is a change in displacement of the linkage which by definition is rate.

From the foregoing, it has been shown that for a displacement of lever system 10, there is a force opposing this movement, and this force is a function of the force P or F and the magnitude of the linkage displacement, or stated another way, this mechanism provides a rate. The following is intended to illustrate how, by the use of my novel device, the rate is made proportional to the load imposed on the linkage system.

Since it is this change in the vertical component of vector C which ultimately opposes the displacement (which is the opposing force mentioned immediately above), then it follows that the rate is a function of the load P or F. Stated another way from the vector diagrams in FIGS. 2 and 3, it will be appreciated that a linkage displacement produces a change in vertical component of vector C (note that $C_1$ and $C_1'$ are of a different size than C and C', respectively, and correspondingly D and D' are also of a different size), and this change is proportional to the magnitude of the displacement of the linkage and to the magnitude of force P or F. This is in contrast to the situation where a spring is employed because the rate of the spring (i.e. the unit displacement per unit force) is always constant as defined by its structural geometry and is not a function of the load. In my novel device, the condition where the load level is low, for a unit change in force, there will be one displacement at a higher force level for the same unit change in force, there will be an entirely different displacement. Of course the displacement, in the case where the level of the force is small, will be larger than the case where the level of the force is large.

Figure 4:
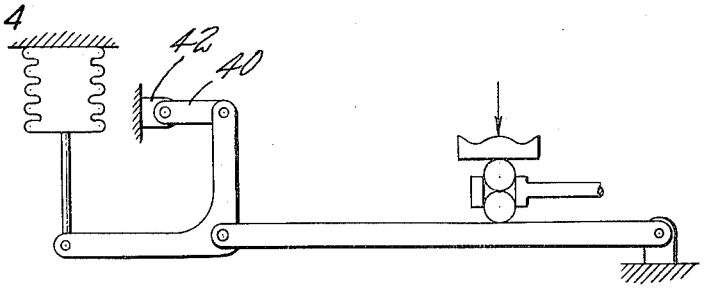
FIG. 4 is a schematic diagrammatic illustration of another means for obtaining a rate proportional to a load.

FIG. 4 illustrates a modification of my invention for obtaining the identical results as illustrated by the mechanism shown in FIG. 1. As shown, link 40 is connected to the bottom end of the vertical arm of bell crank 14. It will be noted that the bell crank is constrained in its movement by link 40 and its pivot support 42 so as to move along a circuitous path. I have found that the rate of the system for a particular load level may be obtained by giving a particular length to linkage 40, or in the case of a roller and cam arrangement, this value may be obtained by properly selecting roller and cam sizes. (The difference between the radius of roller 24 and the radius of curvature of cam 32 is what determines the rate.) It will be noted that the cam surface 28 is an arc of a circle but may take other forms to introduce nonlinearities in the system.

Figure 5:
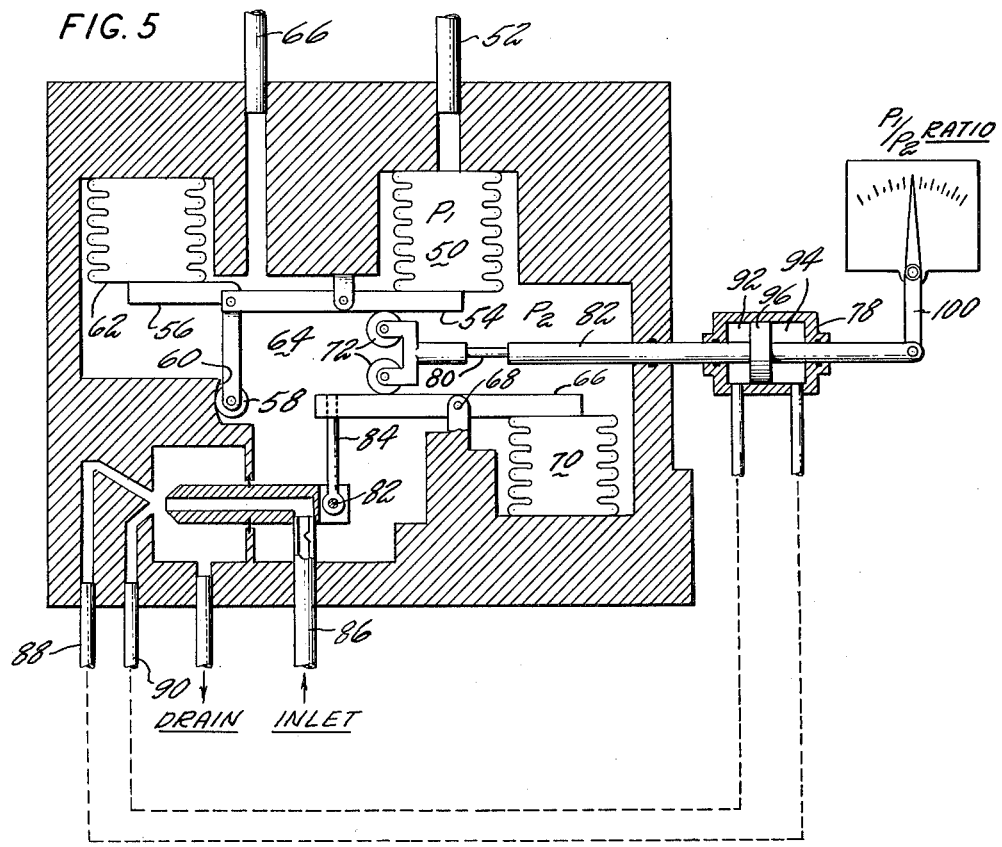
FIG. 5 is a schematic drawing of an improved pressure ratio sensor utilizing this invention.

Referring to FIG. 5, I have illustrated a particular application embodying this invention and is utilized in this scheme in order to obtain a constant gain so that the dynamic response will be the same regardless of the sensed load level to which this system is subjected. This particular embodiment illustrates a pressure ratio sensor which is capable of measuring the ratio between two pressures which for illustration purposes have been designated as $P_1$ and $P_2$. $P_1$ is admitted internally of bellows 50 through line 52, and the free end of the bellows acts upon fulcrum lever 54 for rotation thereof, in accordance with the contraction or expansion of the bellows. As is evident, the rate mechanism illustrated in connection with FIG. 1 is adapted to the linkage system as follows:

The lever 54 carries on its left end, bell crank 56 which is pivotally supported thereto. Roller 58 rides along cam surface 60 in the same manner as described in connection with FIG. 1. An evacuated bellows 62 responds to the pressure emitted internally in cavity 64 by line 66 which is the $P_2$ pressure. A second lever 66 is disposed in the cavity 64 and is located substantially parallel to lever 54. The right end of lever 66 which is pivotally supported at pivot point 68 is attached to the free end of bellows 70 which is also subjected to $R_2$. Roller 72 rides along the inner surfaces of levers 54 and 66 for effectively varying the lever ratio of the system. The rollers are mechanically positioned by servomotor generally indicated by numeral 78. Flexure 80 may be disposed at a point intermediate the connecting rod 82 to allow roller 72 to move radially. The left end of arm 66 is connected to "Askania" nozzle 82 by link 84. High pressure fluid is admitted to the nozzle from a high pressure supply source, not shown, via line 86 for ejecting fluid into lines 88 and 90, depending on its position. The position of the nozzle will determine the pressure flow characteristics to the piston in chambers 92 and 94, which in turn determines the position of piston 96 of servomotor 78. In this manner piston 96 and similarly lever 100 will seek a position due to the repositioning of the roller 72 which is indicative of the pressure ratio $P_1$ and $P_2$.

It should be understood that the pressure ratio sensor does not form a part of this invention but is merely illustrative of one of the many applications for which this novel rate device is suited. In this system the benefits derived by employing the bell crank and cam arrangement for obtaining a rate proportional to the load improves this ratio sensing device by assuring that the time responsiveness in which arm 100 moves with respect to a change in either $P_1$ or $P_2$ will be substantially the same whether the pressure in the cavity or bellows is either at a low or a high level. Stated another way, the gain of the system is maintained at a constant value. This is most important, for example, in aircraft application where a sensing device of this type may be employed to sense Mach number over a range of varying altitudes, and the altitude in turn is one of the pressures influencing the pressure ratio sensor.

What has been shown by this invention is a simple device which can be used in such a manner as to obtain a rate which is proportional to a load. It has also been shown that by the use of my device for a particular application, the gain or the time responsiveness of a force ratio servo system may be made constant, independent of the sensed force level.

It should be understood that the invention is not limited to the particular embodiment shown and described herein, but that various changes and modifications may be made without departure of the spirit and scope of this novel concept as defined by the following claims.

I claim:

1. A rate device comprising a fulcrumed lever having means for imparting a force for movement thereof, a bell crank operatively connected to said lever and including a first arm, a roller mounted on the free end of said arm, a stationary cam continuously engaging said roller, means for imparting a force to the other arm of said bell crank, whereby the forces generated on said lever and arm produce a load which is absorbed by said cam.

2. Means for varying the rate as a function of a load comprising a fulcrumed lever, a second lever pivotally mounted on said fulcrumed lever, means for imposing a load on each of said members, a fixed device having a concaved surface portion, follower means mounted on said second lever adapted to ride along said surface, said fixed device being capable of absorbing the load imposed by said load imposing means.

3. In a ratio sensor intended to produce an output signal which is equal to the ratio of two variables, means means responsive to each of said variables for producing a ratio signal, control means including a linkage cooperating with each of said responsive means, servo means operatively connected to said control means for changing the mechanical advantage of said linkage, a rate device cooperating with said linkage which is characterized as producing a rate proportional to said signal.

4. In a servo device adapted to function in a range of force levels, means responsive to at least one variable for producing a signal, a servomotor, control means including a linkage means for receiving said signal, valve means operatively connected to said linkage means wherein a predetermined position of said linkage means will cause said servomotor to displace a predetermined amount, rate means cooperating with said linkage means and adapted to maintain a substantially constant time responsiveness for a predetermined value of said signal so that said displacement will be obtained at a fixed time interval independent of said force level, said rate means comprising a cam having an arcuate surface, a roller connected to said linkage bearing against and movable along said arcuate surface.

5. In a servo device adapted to function in a range of force levels, means responsive to at least one variable for producing a signal, a servomotor, control means including a linkage member for receiving said signal, valve means operatively connected to said linkage member wherein a predetermined position of said linkage member will cause said servomotor to displace a predetermined amount, rate means cooperating with said linkage and adapted to maintain a substantially constant time responsiveness for a predetermined value of said signal so that said displacement will be obtained at a fixed time interval independently of said force level, said rate means comprising a bell crank pivotally secured to one end of said linkage, and a cam having an arcuate surface in sliding relation with one arm of said bell crank.

6. Means for producing a rate proportional to a force comprising a first pivotal member, a first force producing device operatively connected to said member, a bell crank pivotally secured at its apex to one end of said pivotal member, one arm of the bell crank extending normal to the pivotal member when said pivotal member lies in substantially a horizontal plane, a second force producing device operatively connected to said bell crank, a fixed support, a link having one end pivotally secured to the support and the opposite end pivotally secured to said arm, said lever adapted to transmit a force to said support proportional to the force imposed by either of said force producing devices.

7. Means for producing a rate proportional to a force comprising a first pivotal member, a first force producing device operatively connected to said member, a bell crank pivotally secured at its apex to one end of said pivotal member, one arm of the bell crank extending normal to the pivotal member when said pivotal member lies in substantially a horizontal plane, a second force producing device operatively connected to said bell crank, a support, a link having one end pivotally secured to the support and the oposite end pivotally secured to said arm, said lever adapted to transmit a force to said support proportional to the force imposed by either of said force producing devices.

References Cited in the file of this patent

UNITED STATES PATENTS

| | | |
|---|---|---|
| 1,638,102 | Roucka | Aug. 9, 1927 |
| 1,993,544 | Fleischel | Mar. 5, 1935 |
| 2,132,338 | Ziebolz | Oct. 4, 1938 |
| 2,937,528 | Ketchum | May 24, 1960 |

FOREIGN PATENTS

| | | |
|---|---|---|
| 407,903 | Germany | Jan. 5, 1925 |
| 629,052 | France | July 12, 1928 |